United States Patent [19]

Beigel

[11] 4,333,072
[45] Jun. 1, 1982

[54] IDENTIFICATION DEVICE

[75] Inventor: Michael Beigel, Warwick, N.Y.

[73] Assignee: International Identification Incorporated, Rosemount, N.J.

[21] Appl. No.: 64,181

[22] Filed: Aug. 6, 1979

[51] Int. Cl.³ .................... G01S 9/56; H04Q 7/00; H04Q 9/00
[52] U.S. Cl. .................... 340/825.54; 340/572; 343/6.5 SS; 235/449
[58] Field of Search .......... 340/152 T, 572, 149 A; 343/6.5 SS

[56] References Cited
U.S. PATENT DOCUMENTS

| | | | |
|---|---|---|---|
| 3,299,424 | 1/1967 | Vinding | 343/6.5 SS |
| 3,689,885 | 9/1972 | Kaplan | 340/152 T |
| 3,752,960 | 8/1973 | Walton | 235/61.11 H |
| 3,816,709 | 6/1974 | Walton | 235/61.11 H |
| 3,859,624 | 1/1975 | Kriofsky | 340/38 L |
| 3,898,619 | 8/1975 | Carsten | 340/152 |
| 3,964,024 | 6/1976 | Hutton | 340/152 T |
| 4,068,232 | 1/1978 | Meyers | 343/6.8 |
| 4,087,791 | 5/1978 | Lemberger | 340/152 T |
| 4,114,151 | 9/1978 | Denne | 343/6.8 LC |

OTHER PUBLICATIONS

IBM Tech. Dis. Bull., vol. 20, No. 7, Dec. 1977, "Externally Powered Semiconductor Trans.", Dillon et al.

Primary Examiner—Harold I. Pitts
Attorney, Agent, or Firm—Daniel M. Rosen

[57] ABSTRACT

A closed coupled identification system for verifying the identity of an animal, object or other thing, has a probe including a circuit adapted to be connected to a source of alternating current and a separate, preferably miniature, circuit adapted to be implanted within or attached to the animal, object or thing. The probe circuit is held adjacent the implanted circuit for mutually inductively coupling the circuits so that a load applied to the implanted circuit has an effect on the current in the probe circuit. A programmable load is included in the implanted circuit, along with means for sequentially connecting and disconnecting the load to and from the implanted circuit in response to alternating current cycles in the probe circuit, according to a predetermined code program. A signal is derived from the probe circuit having a waveform corresponding to the coded program in the implant circuit. Further means are employed to decode the waveform and to display a number or other representation corresponding to the code program and indicating the identity of the implanted circuit, and, hence of the animal, object or thing.

6 Claims, 5 Drawing Figures

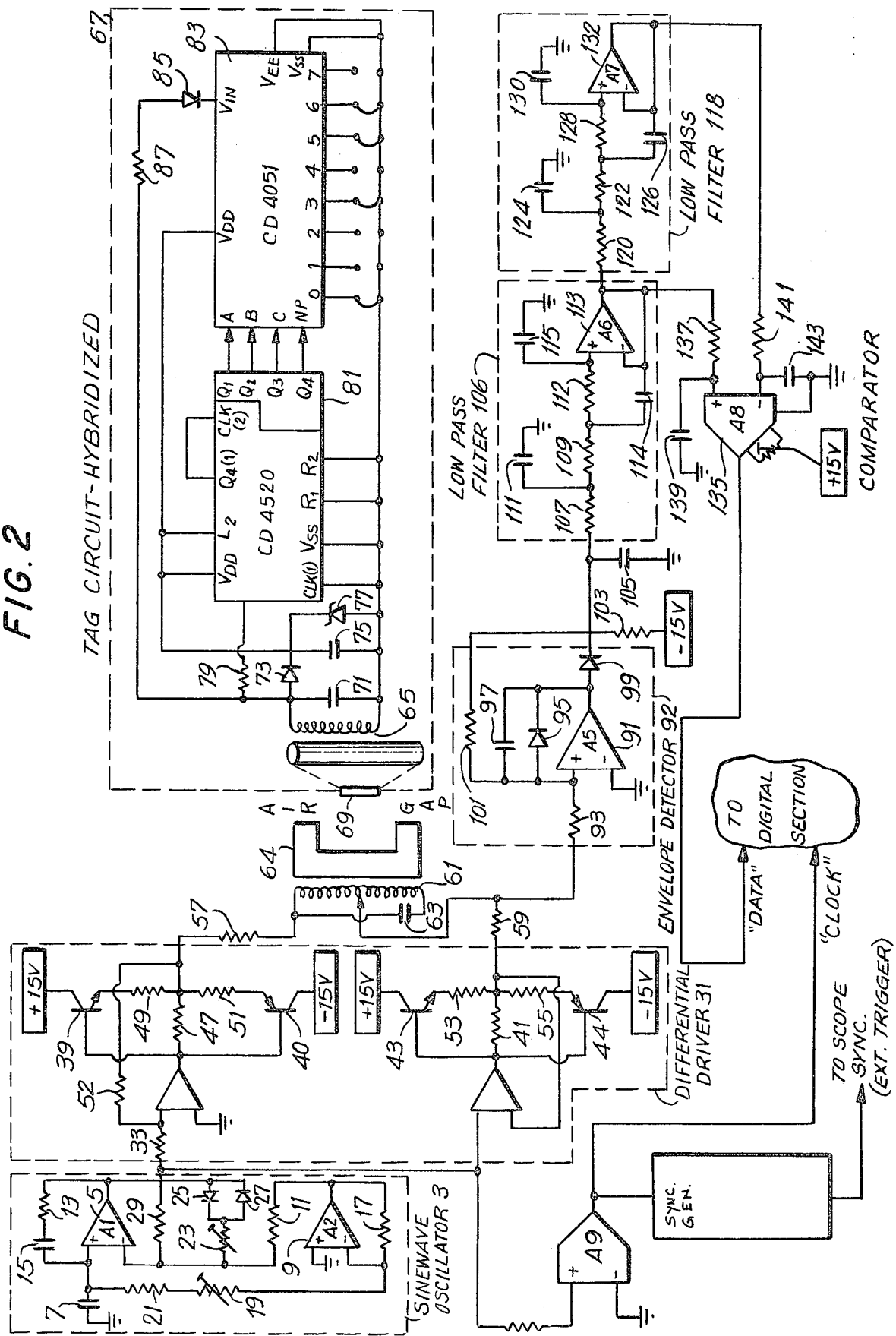

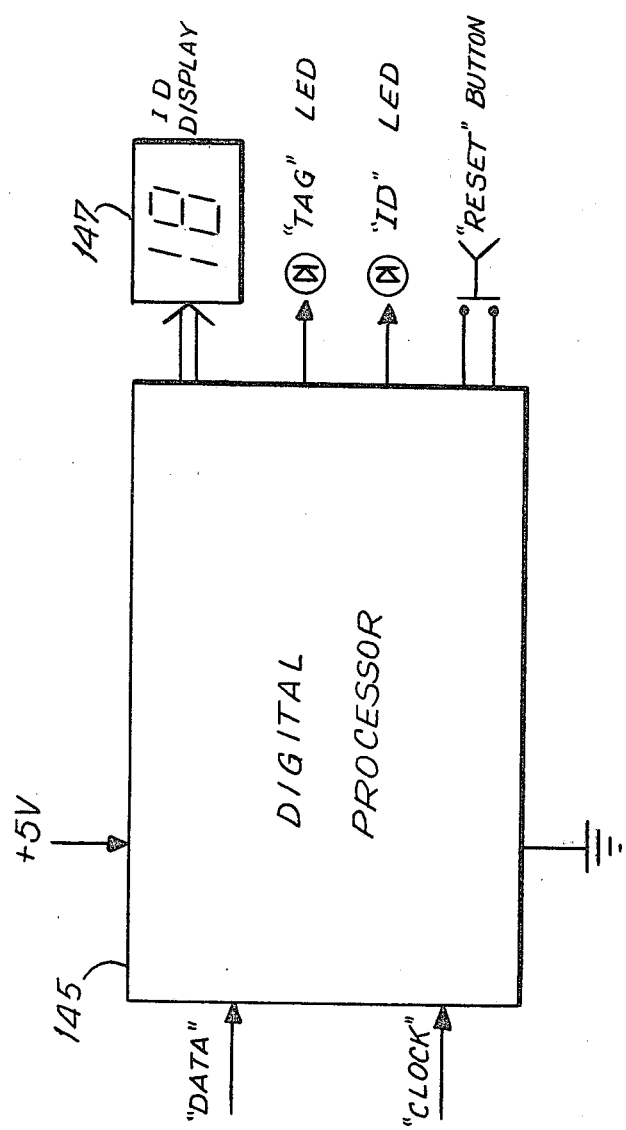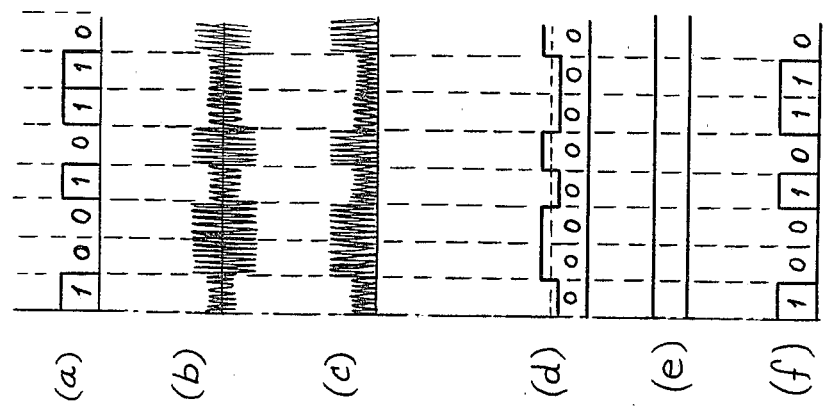

IDENTIFICATION DEVICE

BACKGROUND OF THE INVENTION

This invention relates to a system of positive identification for individual ones of a large number of things, such as animals, objects or other things. More specifically, the invention concerns a system wherein an identifying device is implanted within or imbedded beneath the surface of the thing to be identified so that there is no visual indication of the presence of the identification device. In such systems, positive identification is achieved by the use of an external probe which is brought into close proximity with the implanted or imbedded identifying device and a non-visual contact is made between the probe and the identifying device. Such identification systems are extremely useful in the identification or verification of identification of livestock, particularly thoroughbred horses, and other valuable objects such as boats, luggage, books, etc.

It is known in the applicable art to employ identification systems which include an implantable or imbeddable identification device and a remote probe which is brought into proximity with the identification device for generating a representation unique to the identification device, and hence, to the animal, object or thing to be identified in which the identification device is implanted or imbedded. For example, U.S. Pat. No. 3,689,885 to Kaplan et al for an inductively coupled passive responder and interrogator unit having multidimension electromagnetic field capabilities discloses an interrogator-responder system wherein the electromagnetic energy generated by an interrogator or probe is applied to an identification device in the form of a responder tag. A signal is generated by the responder tag in response to the electromagnetic energy transmitted from the interrogator and is retransmitted back to a receiver in the interrogator, the retransmitted signal containing information on the identity of the responder tag, and hence the thing to which it is attached, which information is processed and displayed for identification purposes.

U.S. Pat. No. 3,706,094 to Cole et al for an electronic surveillance system discloses a similar system wherein the identification device includes a substrate of piezoelectric material having coded information stored within it. The electromagnetic energy transmitted by a remote probe brought into proximity with the identification device is converted into acoustic energy and then back to electromagnetic energy and retransmitted back to a receiver in the probe after being modulated by the coded information. Still another approach to the problem of identification is disclosed in U.S. Pat. No. 3,859,624 to Kriofsky et al for an inductively coupled transmitter-responder arrangement. Kriofsky also discloses identification systems employing an interrogator and responder tag wherein the electromagnetic energy is transmitted from the interrogator to the responder tag and the signal is retransmitted from the responder tag to the receiver in the interrogator for identifying the responder tag and the thing to which it is affixed.

The foregoing systems as well as other systems in the prior art for use in the remote identification of things all require that an energy signal be transmitted from a probe to an implanted or imbedded or otherwise attached identification device and that an energy signal then be retransmitted from the identification device back to a receiver in the probe. This necessitates the use of two transmission-reception channels as well as transmission and reception circuitry in both the probe and identification device. It also requires that the identification device which is implanted, imbedded or attached, include one or more active devices and/or one or more energy storage devices for providing an energy signal responsive to the signal transmitted from the probe for retransmission back to a receiver in the probe. Since it is necessary to make the identification device as small as possible, particularly in cases where it is to be implanted beneath the skin of an animal, it is desirable to eliminate the need for active and energy-storing devices which restrict the minimum size and weight of such devices. Moreover, it is also desirable to eliminate the use of active and energy-storing devices which generate heat and electromagnetic radiation as such emissions may be harmful to the animal or object in which the device is implanted. In addition, conventional remote identification systems are susceptible to interception of signals by unwarranted observers or listeners, a feature resulting in low security aspects.

SUMMARY OF THE INVENTION

The present invention overcomes the problems of the prior art in teaching the construction and use of a close-coupled identification system wherein the electromagnetic energy radiated from a probe is induced into an implanted or imbedded identification device which merely loads the probe circuit and which does not retransmit a signal to the probe, hence obviating the need for receiver circuitry in the probe and further obviating the need for active or energy-storing elements in the identification device for retransmitting a signal to the probe. Specifically, the invention teaches the construction and use of an apparatus in a close-coupled identification system, including a probe having a first electrical circuit adapted to be connected to a source of alternating current, an implantable, imbeddable or affixable identification device including a second circuit adapted to be inductively coupled to the first circuit for induction of an alternating voltage in the second circuit. Means are provided for loading and unloading the second circuit in a predetermined time sequence over a predetermined period of time in accordance with a code program. A sensor responds to the current in the first circuit, and in particular the loading effect on the current as a result of the loading of the second circuit, for producing an output signal having a characteristic which varies in a time sequence dependent upon the time sequence in which the second circuit in the identification device is loaded and unloaded.

The load can include a number of pairs of electrical terminals, some of which are mutually conductively coupled and others of which are insulated from one another. Switching means, responsive to the cycle of the alternating current in the first circuit sequentially connects the second circuit to the terminal pairs so that the second circuit is loaded when connected to a terminal pair which is mutually conductively coupled and unloaded when connected to a terminal pair in which the terminals are insulated from one another. Means for deriving a signal with an amplitude characteristic dependent on the magnitude of the alternating current in the first circuit, and hence upon the sequence in which the second circuit is loaded, is provided as is a means for decoding the signal and for displaying a number or other representation indicative of the identity of the thing with which the identification device is associated, by attachment or implantation. The invention teaches both the construction of apparatus for use in the close-coupled identification system and a method of employing such a system for close-coupled identification, the concept of close-coupling further aiding in security by making unauthorized electronic eavesdropping or interception extremely difficult, if not impossible, due to the close spacing.

It is therefore an object of the invention to provide a close-coupled identification system which includes an implantable identification device or tag which can be extremely small.

Still another object of the invention is to provide a close-coupled identification system which can be used to identify living things without adverse biological effects or consequences.

Still another object of the invention is to provide a close-coupled identification system which employs an implantable identification device having an extremely long life and requiring no replaceable internal power sources.

A further object of the invention is to provide a close-coupled identification system, including implantable identification devices which can each be encoded with a unique code selectable from a very large number of possible codes.

Still a further object of the invention is to provide a close-coupled identification system employing implantable identification devices which can be fabricated economically in large quantity and at low cost.

An additional the object of the invention is to provide a close-coupled identification system providing a high degree of security to prevent identification with unauthorized devices.

It is also an object of the invention to provide a close-coupled identification system capable of remotely identifying an implanted identification device and/or verifying whether an object has an identification device implanted within it without necessity for transmission of a signal from the identification device to the identification probe.

Other and further objects of the invention will be apparent from the following drawings and description of a preferred embodiment of the invention in which like reference numerals are used to indicate like parts in the various views.

DESCRIPTION OF THE DRAWINGS

FIG. 2 is an electrical circuit schematic diagram of the apparatus of the preferred embodiment of the invention.

FIG. 3 is a plot of various waveforms of signals developed in the practice of the invention on a common time axis.

FIGS. 4 and 5 are logic block diagrams of the signal processing and display circuitry used in conjunction with the apparatus of the preferred embodiment of the invention.

DESCRIPTION OF THE PREFERRED EMBODIMENT

The preferred embodiment of the close-coupled identification system of the invention employs an electromagnetically coupled probe and identification device, the latter sometimes being referred to as a tag circuit.

Using low frequency or radio frequency inductive coupling on the order of 100 kHz to 10 MHz, the probe emits a sinusoidal electromagnetic field which energizes the circuitry in the identification device or tag circuit. The identification device includes a load which is applied to the circuitry therein in accordance with a programmed sequential digital code to modulate the amount of power drawn by the identification device circuit from the probe circuit. Circuitry within the probe senses the change in energy absorbed by the load in the identification device circuit and derives a signal having a waveform similar to the waveform generated in the identification device circuit as a result of the sequential loading and unloading of the identification device circuit in accordance with the code program.

Circuitry within the probe or connected to it is used to verify that a valid sequence of loading and unloading of the identification device circuit has occurred, that is, that the perceived loading effect is uninfluenced by spurious signals. The derived signal is processed to obtain a signal indicative of a numerical identification code or other graphic representation which can be displayed visually or presented for input into a compatible computer data processing system. The computer system may have, stored within it, indicating information relative to the identification to be made and/or other information of relevance to the animal, object or thing which is to be identified.

The identification device is preferably very small, that is, on the order of 1/16 to ¼ of a square inch in surface area and about 1/16 of an inch in thickness. It is powered by electromagnetic energy radiated as the result of an alternating current in the circuit of the probe. The energy is applied to the circuit in the identification device or tag circuit by means of induction when the probe and identification device circuits are brought into close proximity. Circuitry in the probe system monitors the power consumed by the load in the tag circuit. From the changes in power consumption, a sequence of digital pulses are derived which are analyzed for validity and, if valid, used to drive a display on which a number represented by a code programmed into the tag circuit can be read.

Figure 1:
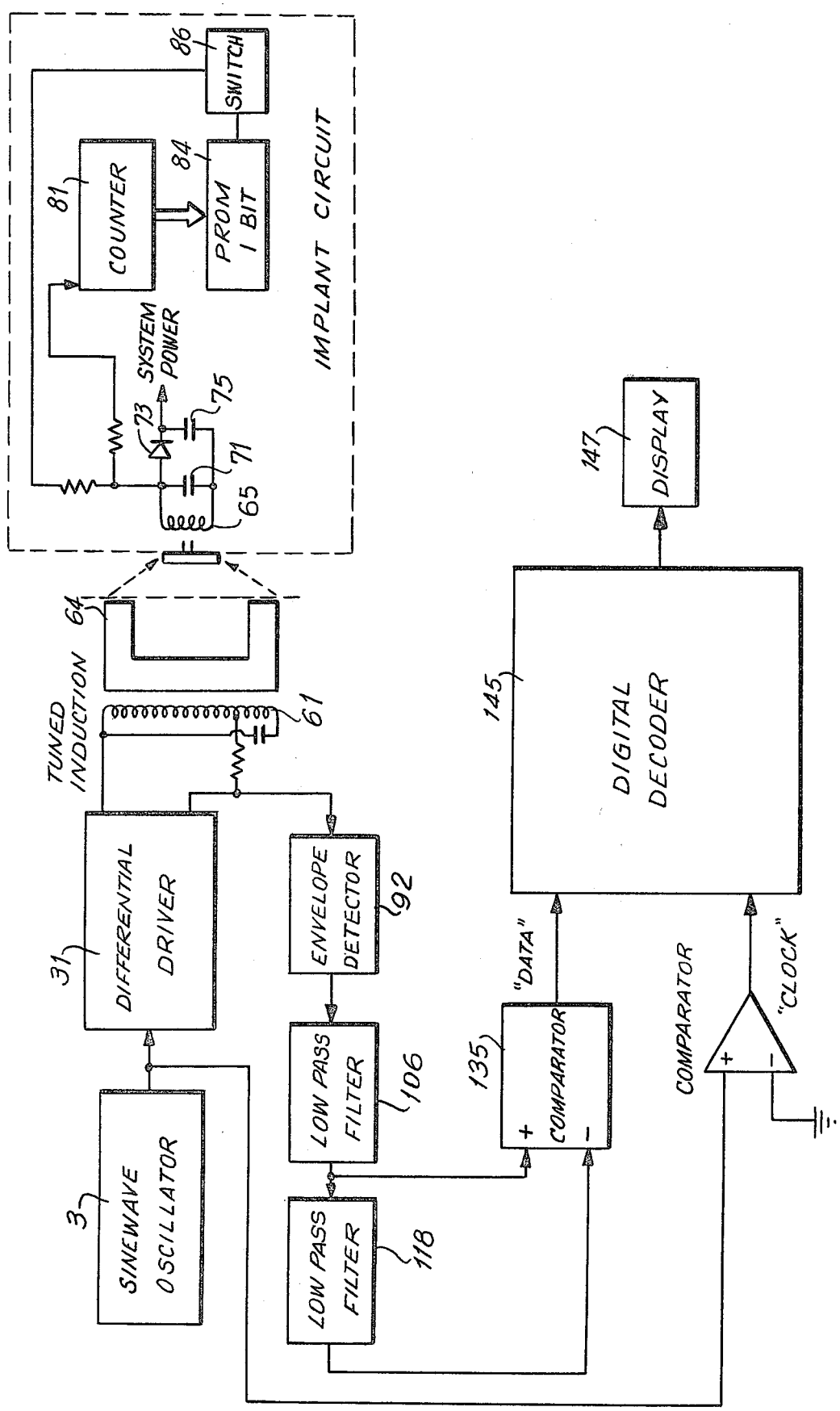
FIG. 1 is a general block diagram of the apparatus of the preferred embodiment of the invention.

Referring now to the drawings, FIG. 1 is a general block diagram and FIG. 2 a detailed circuit diagram illustrating the blocks of FIG. 1. The probe of the close-coupled identification system includes a sine-wave oscillator 3 in the form of an amplitude-stabilized Wien bridge. The positive input of a high-speed operational amplifier 5 is connected to a reference point, such as a ground, through a capacitor 7. The negative input of the amplifier 5 receives the output of a second high-speed operational amplifier 9 through a resistor 11. Feedback to the positive input of the amplifier 5 is provided through a resistor 13 and a capacitor 15. Feedback is also provided to the negative terminal of the amplifier 9 through a resistor 17 which is connected to the capacitor 7 through a variable resistor 19 and a fixed resistor 21. The output of the amplifier 9 is also applied through the resistor 11 to a variable resistor 23 in series with a diode bridge including parallel oppositely polarized diodes 25 and 27 and to a parallel resistor 29. A circuit similar to the foregoing circuit of the sine wave oscillator 3 is disclosed in the text of "Handbook of Op Amp Circuit Design", Stout and Kaufmann ed., McGraw-Hill Book Co. 1976 at pages 21-1 to 21-5.

The output of the sine wave oscillator has a frequency adjustable between 200 and 225 KHZ and an amplitude adjustable between 5 and 10 volts, peak to peak, and is applied to the input of a differential driver 31. The sine wave output of the oscillator 3 is applied through a resistor 33 to the negative input of an amplifier 35 where it is inverted and directly to the positive input of an amplifier 37. The output of the amplifier 35 is connected to the respective bases of transistors 39 and 40, while the output of amplifier 37 is connected to the respective bases of transistors 43 and 44. The collectors of transistors 39 and 43 are biased at a positive 15 volts while the collectors of transistors 40 and 44 are biased at a negative 15 volts. The output of the amplifier 35 is connected through a resistor 47 to the emitter of the transistor 39 through a resistor 49, to the emitter of transistor 40 through a resistor 51 and back to the negative input of the amplifier 35 through a resistor 52. The output of the amplifier 37 is connected through resistor 41 to the emitter of transistor 43 through resistor 53 and to the emitter of transistor 44 through resistor 55.

The output of the circuit associated with amplifier 35 is applied to a voltage dropping resistor 57 and the output of the circuit associated with the amplifier 37 is applied to a voltage-dropping resistor 59. The resistors 57 and 59 are connected to a coil 61, with the resistor 59 being connected to a center tap of the coil 61. A capacitor 63 is connected in parallel with the coil 61.

The circuits associated with the amplifiers 35 and 37 form a differential driver 31 which provides an increase in power. Since amplifier 35 is connected in an inverting configuration, while amplifier 37 is not, the sinusoidal output of the oscillator 3 is converted to out-of phase and in-phase components by the amplifiers 35 and 37, respectively, while current gain is provided by the transistors 39, 40, 43 and 44 to energize the coil 61. The differential driver 31 provides a high level transmission of power to the coil 61. By using standard power supply voltages and combining the inphase and out-of-phase components of the sine wave output of the oscillator 3, a four-fold increase in power is realized. Like amplifiers 5 and 9 in the sine wave oscillator 3, the amplifiers 35 and 37 are of the high-speed type and are commercially available under the designation AD518. The power-gain circuit, including amplifiers 35 and 37, is disclosed in the text, "Designing with Operational Amplifiers", Jerald G. Graeme, Burr-Brown Research Corp. 1977 at page 12.

The coil 61 is a center-tapped inductive coil wound on a ferrite "U" core 64. The coil 61 is connected to the capacitor 63 to form a resonant circuit at the preferred excitation frequency which is in the range of 200 to 220 kHz. When driven by the resistors 57 and 59 connected to the outputs of a differential driver 31, the resonant inductive circuit, including the coil 61 and capacitor 63, develops additional voltage gain in the manner of a resonant auto-transformer. Power consumption at resonance is relatively low.

A coil 65 is connected in a tag circuit 67 which can be implanted beneath the skin of an animal which is to be identified. When identification is to be made, the probe is positioned with the coil 61 adjacent the tag circuit coil 65. The coil 65 is wound on a cylindrical ferrite core 69 which is dimensioned with a length approximately equal to the separation distance of the pole pieces of the "U" core 64 to enhance close-range inductive coupling between the coils. For this purpose, the electromagnetic field from the coil 61 is focused between the pole pieces of the U core 64 so that the ferrite core 69 and the coil 65 each absorb a maximum amount of electromagnetic energy when the coils are in close mutual proximity as shown in FIG. 1.

Inductive coil 65 and a capacitor 71 form a resonant circuit, with resonance being at the same frequency as that of the resonant probe circuit formed by coil 61 and capacitor 63. The voltage developed across the coil 65 by induction from the probe coil 61, when the coils are in close proximity, is sufficient to power the tag circuit 67. The voltage across the coil 61 varies inversely with the power transferred from the coil 61 to the coil 65. By varying the load on the coil 65 to change the amount of power consumed in the tag circuit 67, and measuring the power consumption as reflected in the voltage across the inductor 61, information indicative of the identity of the object in which the tag circuit 67 is implanted, can be ascertained.

The alternating voltage across the coil 65 and capacitor 71 is rectified by a diode 73 to power the logic circuitry included in the tag circuit 67. A capacitor 75 provides low-pass filtering resulting in a smoothed DC voltage for the power function. A zener diode 77 stabilizes the DC voltage and also protects the logic circuitry against overloads caused by high voltage which may be developed across the inductor 65 and capacitor 71.

A resistor 79 couples the alternating voltage across the inductor 65 and capacitor 71 to the increment input of an eight-stage CMOS counter 81. The counter 81 is successively incremented by each cycle of the alternating voltage waveform at the coil 65 during induction from the sinusoidal output voltage at the coil 61 in the probe. The eight counting stages of the counter 81 are serially connected. The counting cycle is recirculating so that when every one of the binary counterstages has the value of a logical "1", the next cycle of the alternating voltage causes the counter to go to 0, that is, each of the counter's binary stages are reset to a logical value of "0". The count sequence then repeats in response to successive cycles of the alternating voltage.

The first four stages of the counter 81 serve as a frequency reducer, dividing the sinusoidal frequency of the incoming voltage by a factor of 16. The factor of 16 is not critical and smaller or greater divisors can be used, although it is preferable to provide modulation over a number of cycles, thereby simplifying the demodulation and decoding to be done in the probe circuitry for deriving identification data.

The last four counting stages of the counter 81 are connected to provide control signals to a CMOS eight-channel multiplexer circuit 83. The eight-channel multiplexer circuit is commercially available under the model designation CD4051. The fifth, sixth and seventh counting stages of the circuit 81 are used to address the eight switching devices included in the multiplexer circuit 83. The circuit 83 is employed as a variable load on the coil 65 which each of the eight switching devices included in the circuit 83 being connected to one of a respective pair of terminals, the other terminal of each respective pair being connected directly to the coil 65 through a resistor 87. The eighth counting-stage of the circuit 81 is used to apply an "inhibit" signal to the multiplexer 83.

As the counter 81 cycles through its counting sequence, each of the eight switching devices incorporated in the multiplexer 83 are sequentially addressed and actuated. Hence an eight-bit code sequence is created. Since the last counter stage of the counter 81 inhibits the switches in the multiplexer 83, a sequence of eight "blank" data spaces occurs between each eight-bit code sequence.

In order to create a unique code for the tag circuit 67, individual ones of terminals of a pair are either conductively coupled or the terminals of a pair are not connected and are insulated from one another by an intermediate gap. Conductive coupling between the terminals of a pair is accomplished in the preferred embodiment of the invention by bonding a "micro-wire" to the circuit substrate of the multiplexer 83. Other methods of effecting the conductive connection include fusible link memory programming techniques and laser-vaporization of device connections on the integrated circuit chip itself, or mechanical means of destroying the device connections.

Terminal pairs which are mutually conductively coupled can be considered to be associated with a logical value of 1 and they will load the circuit of the inductor coil 65 when addressed by the output of the counter 81. Multiplexer terminal pairs which are insulated will not load the circuit of the coil 61 when addressed by the counter 81 and these may be considered to be associated with a logical value of 0.

The output of the multiplexer 83 is connected to the tag circuit coil 65 through a diode 85 and a resistor 87. The diode 85 prevents shorting to the substrate of the integrated circuit by a parasitic mechanism implicit in the CMOS circuitry. The resistor 87 limits the power drawn through the switching devices of the multiplexer circuit 83 to protect against overload. As cycles of the alternating voltage are applied inductively by the probe coil 61 to the tag circuit coil 65, the counter 81 is cycled to count so that there is a binary output at its fifth, sixth and seventh stages equivalent to the decimal numbers 0 through 7. With each new cycle of the alternating voltage, a succeeding switching device is addressed in the multiplexer 83. Depending upon whether the terminal pair associated with the switching device is mutually conductively coupled or insulated, more or less current is drawn by the coil 65. As a result, there is a decrease in the voltage in the probe coil 61 when a mutually conductively coupled terminal pair is addressed and no decrease in the voltage in the probe coil 61 when an insulated terminal pair is addressed.

The circuitry for deriving identification information from the change in voltage across the coil 61 caused by the loading of the coil 65 when a mutually conductively coupled terminal pair is addressed by the multiplexer 83 and unloading of the coil 65 when an insulated terminal pair is addressed by the multiplexer 83 will now be described. The output of the differential driver 31 is coupled to the probe coil 61 through resistors 57 and 59. As the voltage across the coil 61 varies due to the loading and unloading taking place in the tag circuit 67, there is a corresponding variation of voltage across resistors 57 and 59. Thus, when the probe is actuated while in close coupled proximity to the tag circuit coil 65, the voltage across the coil 61 will be modulated in accordance with the code sequence programmed into the multiplexer 83 in the tag circuit 67 by coupling and insulating terminal pairs.

The voltage across resistors 57 and 59 is applied to the negative input of an amplifier 91 through a resistor 93, the positive input of the amplifier 91 being connected to ground. The amplifier 91 is connected in a rectifier circuit 92 which includes a feedback diode 95, a feedback capacitor 97, an output diode 99 and a feedback resistor 101. Resistor 103 discharges the capacitor 105 at a relatively constant slope to form an envelope follower.

The smooth envelope waveform output of the rectifier circuit including amplifier 91 is applied to the input of a low pass filter 106, including input resistor 107, resistor 109, grounded capacitor 111, resistor 112, amplifier 113, capacitor 114 and capacitor 115. The cutoff frequency of the filter 106 is set to allow the smooth envelope waveform to retain the modulated code characteristic produced at the probe coil 61.

The output of the low pass filter 106 is applied to a second low pass filter 118 which includes resistor 120, resistor 122, capacitor 124, capacitor 126, resistor 128, capacitor 130 and amplifier 132. The cutoff frequency of the second filter 118 is set substantially lower than the cutoff frequency of the first filter 106. This serves to filter out the modulated code characteristic of the waveform while preserving the average DC level of the voltage across inductor 61. In this way, the modulated code can be compared to the average signal level, irrespective of the average power being drawn from the inductor 61.

The average value of the voltage associated with the coil 61, that is, the output voltage of the filter 118, is subtracted from the code modulated voltage output of the filter 106 in a differential comparator 135. The output of the filter 106 is applied to the positive input terminal of the comparator 135 through a resistor 137, filtering being provided by a capacitor 139, while the average voltage output of the filter 118 is applied to the negative input of the comparator 135 through a resister 141 with filtering being provided by a capacitor 143. The output of the comparator 135 consists of a digital waveform which can be decoded in a digital processor 145 and displayed by means of a digital seven-segment display employing light emitting diodes or liquid crystal devices or serve as an input to a digital computer system.

Before an explanation is given as to how the digital processor 145 performs its decoding function, a description of the functioning of the probe decoding circuitry, which includes the rectifier 92, first low pass filter 106, second low pass filter 118 and differential comparator 135 will first be given.

Referring now to FIG. 3 of the drawings, in FIG. 3(a) there is shown a graphical representation of the code programmed into the multiplexer 83 of FIG. 2. As previously stated, each pair of terminals connected to the switching devices of the multiplexer 83 which are mutually conductively coupled represent a logical "1" while those terminal pairs which are insulated represent a logical "0". In the multiplexer 83 of FIG. 2, reading from left to right, the first, fourth, sixth and seventh terminal pairs are mutually conductively coupled while the second, third, fifth, and eighth terminal pairs are insulated. This particular coding, as graphically illustrated in FIGS. 2,3(a), shows a code of 10010110 with the "1" represented by high level pulses and the "0's" represented by low level or 0 amplitude pulses. This code is exemplary and numerous other eight-bit codes are available. The bit length can be arbitrarily long, depending on counter stage length. In FIG. 1, an alternative is shown. Here, a programmed read-only memory (PROM) 84 can be employed to modulate a solid state switch 86. The PROM is designed to produce a pulse wave similar to that of FIG. 3(a) when the inductive coil 61 of the probe is caused to excite the inductive coil 65 of the tag circuit 67.

As the counter 81 is cycled to count from 0 to 7, each of the terminal pairs in the multiplexer 83 are sequentially addressed. The effect of the sequential addressing of the terminal pairs connected to the multiplexer 83 as it is connected is to detect mutually conductively coupled pairs, as addressed. At this time the tag circuit 67, including coil 65 is loaded, resulting in a reduction in the power of the probe circuit, including coil 61. Hence, the first pulse in FIG. 3(b) has a diminished amplitude. This is contrasted against the greater amplitude of the next pulse which corresponds to the addressing of the second terminal pair associated with the multiplexer 83, which terminal pair is insulated so that power in the probe circuit is not reduced. As can be seen from FIGS. 3(a) and 3(b), for each terminal pair equivalent to a logical 1 in the encoding of the multiplexer 83 which is addressed, there is a decrease in the amplitude modulating the sinusoidal signal in the probe circuit. The modulated sinusoidal waveform is next applied to the envelope detector 92 where it is rectified resulting in the waveform shown in FIG. 3(c).

The output of the envelope detector 92 is then applied to the low pass filter 106 wherein the high frequency sinusoidal oscillations are filtered out and there is some smoothing of the envelope resulting in the waveform of FIG. 3(d). Application of the output signal of the low pass filter 106 to the low pass filter 118 results in further smoothing so that a relatively flat signal equivalent to the average value of the waveform of FIG. 3(d) is produced at the output of the low pass filter 118 as shown in FIG. 3(e). The average value of the waveform of FIG. 3(e) is then subtracted from the output of the low pass filter 106 of FIG. 3(d) to obtain a signal having the waveform of FIG. 3(f) which is similar to the programmed code signal desired as originally shown in FIG. 3(a). The output signal of the comparator 135, shown in FIG. 3(f), is then applied to the digital processor 145 for conversion for display on the indicator 147.

Since the tag circuit 67 may be energized at any point in the count cycle of the counter 81 and the counting sequence is cyclical, it is necessary that a method be provided for insuring that erroneous readings are not taken as a result of actuation of the tag circuit 67 in the middle of a cycle. In addition, it is desirable to be able to insure that the detected code is a valid code and not the result of a spurious signal. In the preferred embodiment of the invention, a self-synchronizing, error-checking data format is used. The code for the tag circuit 67 is actually a four-bit number with each bit being represented by a two-bit serial transmission. For a logical "0", the transmission sequence is 0 followed by 1. For a logical "1", the sequence is 1 followed by 0. This provides a method of checking the validity of each bit transmission since the two adjacent bits which are translated into one bit of the four-bit code number must always be different. Many other conventional error-checking methods may be involved.

To enable detection of the beginning of the code transmission sequence, the eight-bit serial sequence representing the four-data bits of the code, are followed by a blank frame having a time period equal to the time necessary to normally transmit an eight-bit sequence. This is achieved by the last counter stage of the counter 81 which inhibits the switching devices in the multiplexer 83 when it contains a logical "1". The last bit of the counter 81 is at a logical value of 0 as the counter counts from 0 to 7 and then takes on a logical value of 1 as the counter continues to count from 8 through 15, after which the counter recycles and the last bit returns to a logcial value of 0. The blank frame having a period equal to the width of eight sequential pulses can be sensed by the digital processor 145 to synchronize the probe with the tag circuit 67.

Figure 5:
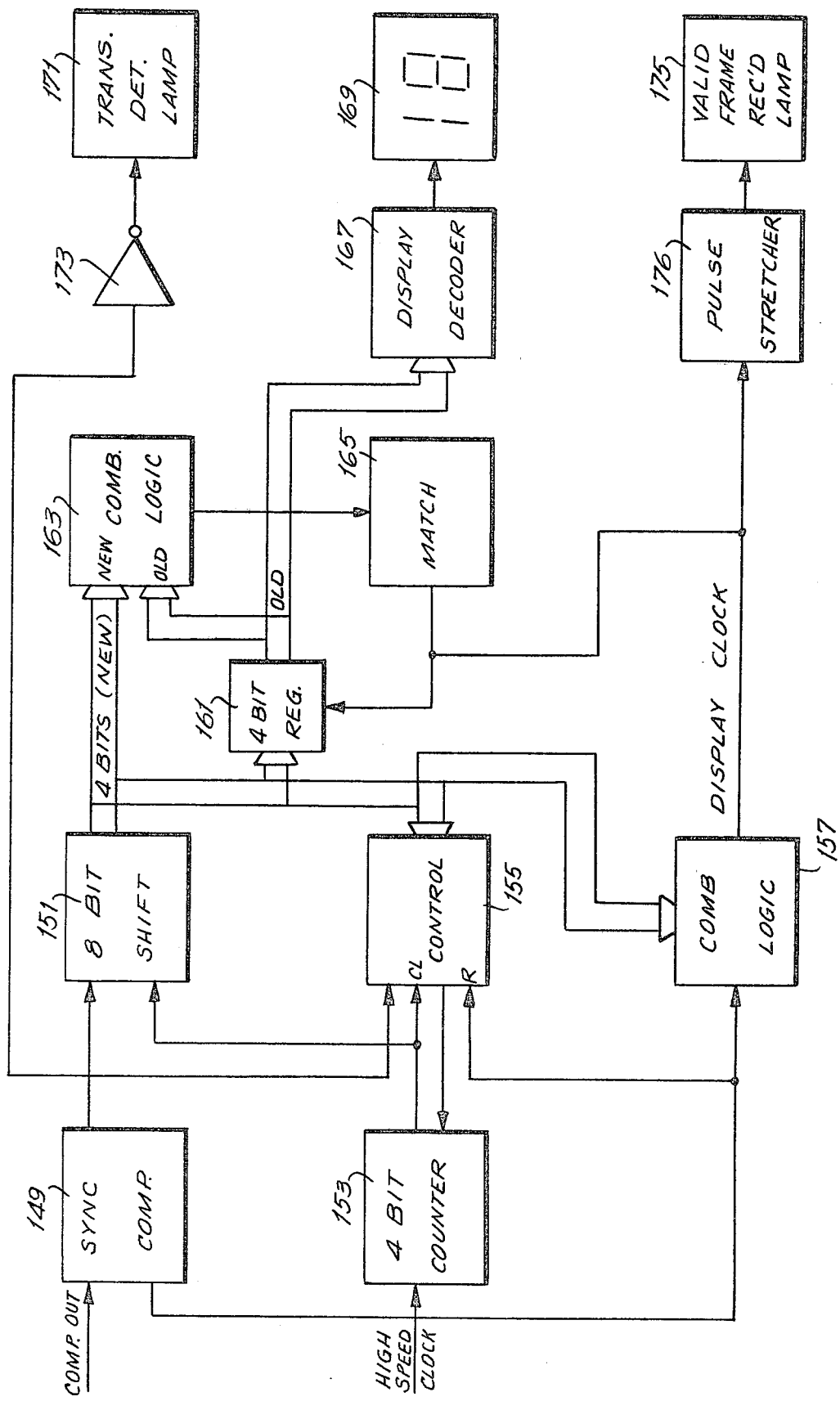

Referring now to FIGS. 4 and 5 of the drawings, there is shown a schematic block diagram of the circuitry in the digital processor 145 and its relationship to the display 147. The data output signal of the comparator 135 containing the code information of the tag circuit 67 is applied to the input of a synchronization circuit 149 for synchronizing the data output of the comparator 135 with the sinusoidal output frequency of the oscillator 31. The synchronizing circuit 149 can include a D flip-flop with the data applied to the D input of the flip-flop and the high-speed clock frequency applied to the C input. The data output of the synchronizing circuit 149 is then applied to an eight-bit shift register 151 for serially entering the data therein. The high-speed clock frequency is also applied to a four-bit counter 153, the output of which is connected to a control circuit 155 which checks for validity of the incoming data by receiving the output data of the synchronization circuit 149 and insuring that the bits of each successive serial pair are different, that is, a 0 followed by a 1, or a 1 followed by a 0.

A combinatorial logic circuit 157 receives the serial data information shifted out of the eight-bit shift register 151 and checks for a "blank" eight-bit data frame which separates successive code data bit transmissions. Following a blank eight-bit data frame, the succeeding eight data bits are decoded as a four-bit number and stored in a four-bit register 161. The data information is also stored in a combinatorial logic circuit 163 which has inputs connected to both the eight-bit shift register 151 and the four-bit storage register 161. Each new data transmission is compared to the preceding data transmission in the combinatorial logic circuit 163. If the newly incoming information bits are identical to the previously stored information bits, indicating that two indentical data frames have been received in succession, a match counter 165 is incremented. This sequence is repeated until the match counter 165 records 256 sequential identical data frames. Once 256 sequential identical data frames have been received, an output signal from the match circuit 165 enables a display recorder 167 which converts the received data signal from the four-bit register 161 for compatability with the seven-segment dual digit display 169.

A lamp 171 and driving amplifier 173 can be provided to indicate that a transmission from the probe to the tag circuit 67 has been detected. A pulse-stretcher circuit 176 connected to receive the output of the combinatorial logic circuit 157 provides a signal to light a lamp 175 indicating that a valid frame has been received.

To the extent numerical values have been specified for any of the parameters set forth hereinabove, it will be understood that such values are described for the purpose of illustration of the preferred embodiment, and are not intended to be limiting. In addition, the use of CMOS components has been described and the components are low current devices and suit the particular power requirements of the invention. It will be understood however that other forms of integrated circuitry, such as Schottky or TTL may be employed, as may other types of circuitry where future improvements in both power capacity and energy use are realized.

It is to be appreciated that the foregoing description is of a preferred embodiment of the invention which can be modified in various ways without departing from the spirit and scope of the invention which is to be determined only by the following claims.

What is claimed is:

1. A reflective close-coupled identification system comprising:

a first electrical circuit adapted to be connected to a source of alternating current and having a first inductive element;

a second electrical circuit to be associated with the object to be identified and having a second inductive element adapted to be inductively coupled to said first inductive element for inducing an alternating voltage in said second circuit, all power consumed in said second circuit being derived from said first inductive element;

means for selectively loading and unloading said second circuit in a predetermined time sequence over a predetermined period of time including a circuit operatively connected to said second inductive element and having a plurality of terminal pairs, the terminals of each pair being either conductively coupled for loading said second circuit when connected to said second inductive element or insulated from one another for unloading said second circuit when connected to said second inductive element, and means for sequentially connecting each of said terminal pairs to said second inductive element, said second circuit being loaded with the terminals of the terminal pair connected to said second inductive element are conductively coupled and said second circuit being unloaded when the terminals of the terminal pair connected to said second inductive element are insulated from one another; and sensor means responsive to said loading and unloading including detector means operatively connected to said source of alternating current for deriving a first signal having a characteristic with a magnitude variable with the instantaneous magnitude of the rate of said loading and unloading;

averaging means operatively connected to said source of alternating current for deriving a second signal having a characteristic with a magnitude proportional to the average of said first signal characteristic magnitude; and subtracting means operatively connected to said detector means and said averaging means for producing an output signal with a characteristic having a magnitude proportional to the difference between said first and second signal characteristic magnitudes and varying in a time sequence dependent upon said predetermined time sequence, thereby providing such identification.

2. Apparatus according to claim 1, wherein said means for loading and unloading is responsive to said altnerating current.

3. Apparatus according to claim 2, wherein the period of each loading and unloading of said second circuit is an integral multiple of the period of said alternating current.

4. Apparatus according to claim 1, wherein said sequential connecting means includes a counter, and addressable selection means responsive to said counter, the one of said terminal pairs connected to said second circuit at any time being dependent on the output of said counter.

5. Apparatus according to claim 4, wherein the frequency at which said counter is incremented is dependent on the frequency of said alternating current.

6. Apparatus according to claim 1, wherein said averaging means includes a low pass filter.

* * * * *